US006950579B2

United States Patent
Ahn et al.

(10) Patent No.: US 6,950,579 B2
(45) Date of Patent: Sep. 27, 2005

(54) POLARIZATION-INDEPENDENT OPTICAL POLYMERIC INTENSITY MODULATOR

(75) Inventors: Joon Tae Ahn, Daejon-Shi (KR); Sun Tak Park, Daejon-Shi (KR); Jong Moo Lee, Daejon-Shi (KR); Myung Hyun Lee, Daejon-Shi (KR); Kyong Hon Kim, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 220 days.

(21) Appl. No.: 10/331,595

(22) Filed: Dec. 30, 2002

(65) Prior Publication Data

US 2004/0086229 A1 May 6, 2004

(30) Foreign Application Priority Data

Oct. 31, 2002  (KR) ................. 10-2002-0067219

(51) Int. Cl.$^7$ .............................................. G02F 1/035
(52) U.S. Cl. ............................................. 385/40; 385/3
(58) Field of Search ................................ 385/1–6, 8–9, 385/16, 23, 39–40, 140

(56) References Cited

U.S. PATENT DOCUMENTS

| 4,936,644 A | | 6/1990 | Rasking et al. |
| 5,555,326 A | | 9/1996 | Hwang et al. |
| 5,751,867 A | * | 5/1998 | Schaffner et al. ............... 385/3 |
| 6,148,122 A | | 11/2000 | Cao et al. |
| 6,647,158 B2 | * | 11/2003 | Betts et al. ..................... 385/2 |
| 6,687,425 B2 | * | 2/2004 | Ridgway et al. ............... 385/14 |
| 2003/0174982 A1 | * | 9/2003 | Ridgway et al. ............ 385/123 |
| 2004/0008916 A1 | * | 1/2004 | Ridgway et al. ............... 385/2 |
| 2004/0022492 A1 | * | 2/2004 | Gunther et al. ................ 385/40 |

FOREIGN PATENT DOCUMENTS

| KR | 1019970071645 | 12/1997 |
| KR | 00269266 | 7/2000 |

OTHER PUBLICATIONS

IEEE Photonics Technology Letters, vol. 11, No. 1, Jan. 1999, "Push–Pull Poled Polymer Mach–Zehnder Modulators with a Single Microstrip Line Electrode", W. Wang, et al. 3 pages.

IEEE Photonics Technology Letters, vol. 8, No. 11, Nov. 1996, "Polymeric Polarization–Independent Modulator Incorporating Twisted Optic–Axis Waveguide Polarization Converters", M. Cheol Oh and Sang–Yung Shin, 3 pages.

* cited by examiner

Primary Examiner—Akm Enayet Ullah
Assistant Examiner—Kevin S. Wood
(74) Attorney, Agent, or Firm—Blakely Sokoloff Taylor & Zafman

(57) ABSTRACT

The present invention relates to the polarization-independent optical polymeric intensity modulator independent of input signal using polymers with electro-optical property. To use the electro-optical property for electro-optical polymer, polymers must be poled by applying high voltage to the waveguide. The size of phase modulation caused by such an poling varies from the biggest value at polarization parallel to the poling to the smallest value at polarization perpendicular to the poling. Therefore, the performance of the electro-optical polymeric intensity modulator depends on the polarization state of input light. The present invention provides the polarization-independent optical polymeric intensity modulator capable of modulating the optical intensity without regard to the polarization of the input signal by making the polarizing directions of two optical paths of M-Z interferometer perpendicular each other.

6 Claims, 4 Drawing Sheets

POLARIZATION-INDEPENDENT OPTICAL POLYMERIC INTENSITY MODULATOR

BACKGROUND OF THE INVENTION

1. Field of the Invention

The present invention relates to the optical signal intensity modulator using the electro-optic effect.

The optical intensity modulator is a required component for transmitting part or the signal processing part in the optical communication. In transmitting part, this modulator is usually used as an external modulator of a continuous oscillation light source and functions as transforming the electric signal into the optical signal. In signal processing part, the modulator usually acts as a switch for passing or cutting off the incident optical signal.

Most optical intensity modulators widely commercialized use the electro-optic effect of $LiNO_3$. The electro-optic effect means that the index of refraction of medium is changed according to the degree of applied electric field, and the value thereof is the electro-optic coefficient.

The configuration and the principle of operation of optical intensity modulator using the electro-optic effect of $LiNO_3$ are as follows. A waveguide like Mach-Zehnder interferometer is formed and electrodes capable of applying electric field to two optical paths or one optical path are formed, on the $LiNO_3$ substrate. Therefore, this structure produces the phase difference between the two paths by the voltage applied from the outside when the light propagates the interferometer. The size of the phase difference causes the constructive interference or the destructive interference. The constructive interference makes the outputted optical intensity maximum and the destructive interference makes it minimum.

At this time, the voltage difference producing the constructive and destructive interferences is called a switching voltage and is referred to $V\pi$. Therefore, when the modulator is driven by the $V\pi$, the intensity of the light propagated through the inteferometer can be switched on and off by the maximum and minimum intensity. The switching voltage is inverse proportional to the multiplication of the length of optical path with voltage applied and the electro-optic coefficient of $LiNO_3$. The higher the performance of the modulator is, the smaller the value of the switching voltage is. And the value of the commercial products is about 5V.

Meanwhile, to use the electro-optic coefficient in the most effective way, it is necessary to make the directions of electric field same as that of light polarization. Therefore, most commercialized $LiNO_3$ optical modulators use polarization-maintained optical fibers for the input end thereof. In the case that the input light is linearly polarized and is exactly incident to the polarization axis of the polarization maintained optical fiber, the intensity of the input light is modualted in the most effective way. Otherwise, modulation may not be occurred in the worst case. In other words, $LiNO_3$ optical intensity modulator commercialized and widely used has extreme sensitive property to the polarization state of input light.

Even if the modulator is sensitive to the polarization, it is possible to use the modulator in the transmitting part for producing the optical signal. Since a linearly polarized light is outputted from the semiconductor laser as a light source, the input signal can exactly arranged to the polarization axis of a polarization-maintained optical fiber on the input end of the modulator. But, when the modulator is used amid the transmission line, light polarization is irregularly changed while the light propagates, so that the characteristic independent of polarization becomes important. When the modulator sensitive to the polarization is used, polarization controller for adjusting the polarization of input light must be inserted before the input terminal. When the single wavelength is inputted to this modulator, potential problem can be relatively solved, but in the case that the WDM (wavelength division multiplexed) optical signal having various wavelengths is inputted, the situation becomes serious. As the wavelengths of each signal have different polarizations respectively, they can be operated in one wavelength and can not be operated in other wavelengths at all.

Therefore, in that case, the wavelengths must be separated per each wavelength using the WDM demuxer, and after the polarization of each wavelength signal is adjusted, the wavelengths with each of the adjusted wavelengths should be incident on the optical intensity modulator using the WDM muxer.

However, in the case that the optical intensity modulator is used for the optical signal processing element, the need for polarization-independent optical intensity modulator is extremely increasing, since it is difficult to integrate the polarization controller.

Meanwhile, there is another type of optical polymeric modulator as an optical modulator using the electro-optic effect. Even though the optical polymer has disadvantages of thermal instability and optical loss, it has been researched for its own characteristics of high speed modulation even more than 100 GHz, big electro-optic coefficient with about 100 pm/V, relatively easy manufacturing process, and integration capability, etc. In order to increase the electro-optic coefficient in the optical waveguide configured using the electro-optic polymer, the polymer must be poled.

2. Description of the Prior Art

Hereinafter, the electro-optic polymer of the prior art will be explained with reference to the FIGS. 1A and 1B.

FIG. 1A shows a plane view, and FIG. 1B shows the cross section of I-I' in FIG. 1A. A Mach-Zehnder interferometer is not appeared on the surface covered by the upper cladding layer 16, marked as a dotted line in the plane view, and as squares 18a, 18b with oblique lines in the cross section. The electrodes 11, 17 are marked as rectangles with oblique lines in the plane view and as thick solid lines on the substrate and the upper cladding layer respectively. The arrow of thick solid lines means the polarization direction and the arrows of thin dotted lines mean the direction of electric field.

Meanwhile, when high voltage is applied with a temperature more than a predetermined temperature after the two electrodes are formed parallel with the optical waveguide therebetween, polymer molecules are arranged to the direction where the electric field is applied, and this defines the poling direction.

Referring to FIGS. 1A and 1B, a structure having an upper cladding layer 16, a core layer 14, a lower cladding layer 12, electrodes 11, 17, and a substrate 10 in that order is shown in the cross section.

In other words, the electrodes are formed at one optical path of the Mach-Zehnder interferometer, wherein a voltage (V) is applied to the electrode 11 and a ground voltage is applied to the electrode 17. At this time, the phase of the light propagating through the path (A) changes, thereby the phase of the light propagating through the path (B) without any electrodes differs from the phase of path (A), so that the phase difference occurs. Constructive or deconstructive interference occurs in accordance with the phase difference, and the voltage differences at which the constructive or deconstructive interference occurs correspond to the switching voltages. The switching voltage becomes smallest in the case that the polarization direction of the input light is same as the poling direction of electro-optical polymers, and biggest in the case that the poling direction of the input light is perpendicular to the polarization direction of electro-optical polymers. Therefore, modulation characteristics greatly change to the polarization state of the input light.

When a driving voltage is applied to the poled waveguide, the phase of the light being propagated changes due to the electro-optic effect. At this time, the value of phase becomes biggest in the case of linearly polarized light having direction same as the poling direction and smallest in the case of linearly polarized light vertical to the poling direction. As the size of phase modulated is varied in accordance with the polarization of the input light for the same operating condition, the electro-optic optical polymeric intensity modulator of Mach-Zehnder interferometer type depends on the polarization.

Meanwhile, Min-Cheol, OH et al discloses the structure of polarization-independent optical modulator that polarization converters for making the polarization vertical are formed amid each of the two optical paths of the M-Z interferometer, and the disclosure is entitled "Polymeric polarization-independent modulator incorporating . . . " (Photonics Technology Letters, Vol. 8, No. 11, pp 1483–1485). However, the polarization adjusting devices are inserted amid the optical path of Mach-Zehnder interferometer, so that the structure becomes more complicated than the conventional modulator structure, and also produces excessive optical losses due to the electro-optical polymers extended by the polarization adjusting device.

Also, U.S. Pat. No. 5,751,867 to J. H. Schaffner et al, entitled "Polarization-insensitive electro-optic modulator", describes the polarization-insensitive optical intensity modulator that the directions of the two optical paths of Mach-Zehnder interferometer is perpendicular each other.

Hereinafter, the polarization-insensitive electro-optical polymeric modulator of the prior art will be explained with reference to the FIGS. 2A and 2B.

As shown in the FIGS. 2A and 2B, all electrodes 21a, 21b and 21c are coplanar formed between the substrate 20 and the lower cladding layer 22. Therefore, when a voltage is applied after the electrodes are connected as shown in FIG. 2A, electric fields are formed in the directions marked as circular solid lines, thereby the two paths of the Mach-Zehnder interferometer become perpendicularly poled each other as shown in solid line.

Therefore, this method can not use the applied voltage in an effective way, because the intensity of the electric field formed along the shortest distance of the electrodes is bigger than that of the electric field circularly formed when a voltage is applied between the two electrodes. Referring to FIG. 2B, the electric field generated in the straight direction where the three electrodes are placed is strong, while that formed in the circular direction for perpendicularly poling the two optical paths each other is relatively weak. Therefore, the aforementioned structure can not use the applied voltage in an effective way, and the problem occurs like that the voltage necessary for switching on-off the optical intensity becomes bigger.

In other words, the polarization-insensitive optical intensity modulators of the prior art have no further elements in the Mach-Zehnder interferometer structure and only change the positions of poling and electrodes for driving a little., so that they have the advantages of having polarization-insensitive characteristics and relatively similar manufacturing processes like the usual modulator, while have the disadvantage that they can not use the applied voltages in an effective way since the electrodes for perpendicularly poling are coplanar types.

SUMMARY OF THE INVENTION

Thus, the object of the present invention is to provide the new type of polarization-independent optical intensity modulator for modulating the light without regard to the polarization state of the input signal.

Other object of the present invention is to provide the polarization-independent optical intensity modulator for improving the effectiveness of electric field formed in the vertical direction at the core layers.

To solve the above problem, one aspect of the present invention provides a polarization-independent optical polymeric intensity modulator, comprising a substrate; a lower cladding layer formed on the substrate; a core layer on said lower cladding layer, said core layer having a first and a second optical guiding path including polymers poled by electric field, wherein each input and output thereof are interconnected; an upper cladding layer formed on said core layer and surrounding said first and second optical guiding path of the core layers; and electrodes formed outside said cladding layers to apply electric fields to said first and second optical guiding paths, the electrodes being positioned to supply said first and said second optical guiding path with electric fields for poling the two paths and driving the modulator, wherein the direction of the electric field applied to said first optical guiding path is perpendicular to said substrate and the direction of the electric field applied to said second optical guiding path is parallel to said substrate.

Preferably, a first electrode and a second electrode can be each positioned perpendicular to the substrate on the upper side of the first optical guiding path (i.e., the surface of the upper cladding layer) and on the lower side of the first optical guiding path (i.e., the surface of the substrate), and a third electrode can be positioned on the same plane from the plane of the second electrode with a predetermined distance at the lower side of the second optical guiding path.

In this case, a ground voltage can be applied to the first electrode and third electrode and a predetermined voltage can be applied to the second electrode, or, a predetermined voltage can be applied to the first electrode and third electrode and a ground voltage can be applied to the second electrode.

Meanwhile, a first electrode and a second electrode can be each positioned perpendicular to said substrate on the upper side of the first optical guiding path(i.e., the surface of the upper cladding layer) and on the lower side of the first optical guiding path (i.e., the surface of the substrate), and a third electrode and fourth electrode can be positioned on the same plane from the plane of the second electrode with a predetermined distance at the lower side of the second optical guiding path.

The other aspect of the present invention provides the polarization-independent optical intensity modulator comprising substrate; a lower cladding layer formed on the substrate; a core layer on said lower cladding layer, said core layer having a first and a second optical guiding path including polymers poled by electric field, wherein each input and output thereof are interconnected; an upper cladding layer formed on said core layer and surrounding said first and second optical guiding path of the core layers; and a first, second and third electrodes formed outside said cladding layers to apply electric fields to said first and second optical guiding paths, wherein said first and second electrodes are each positioned on the upper sides of said first and second optical guiding path (i.e., the upper surface of said upper cladding layer), and said third electrode is positioned on the lower side of said optical guiding path(i.e., the upper surface of said substrate), and wherein the electric field applied to said first optical guiding path and the optical electric field applied to said second optical guiding path are symmetric.

In this case, a ground voltage can be applied to the first electrode and second electrode and a predetermined voltage can be applied to the third electrode, or, a predetermined voltage can be applied to the first electrode and second electrode and a ground voltage can be applied to the third electrode.

Preferably, the electric field of the first and third electrodes and the one of the second electrode are perpendicularly applied each other.

Also, aforementioned optical waveguide core layers can be channel waveguide type core layers or rib (or ridge) waveguide type core layers.

DETAILED DESCRIPTION OF THE PREFERRED EMBODIMENTS

Figure 1A:
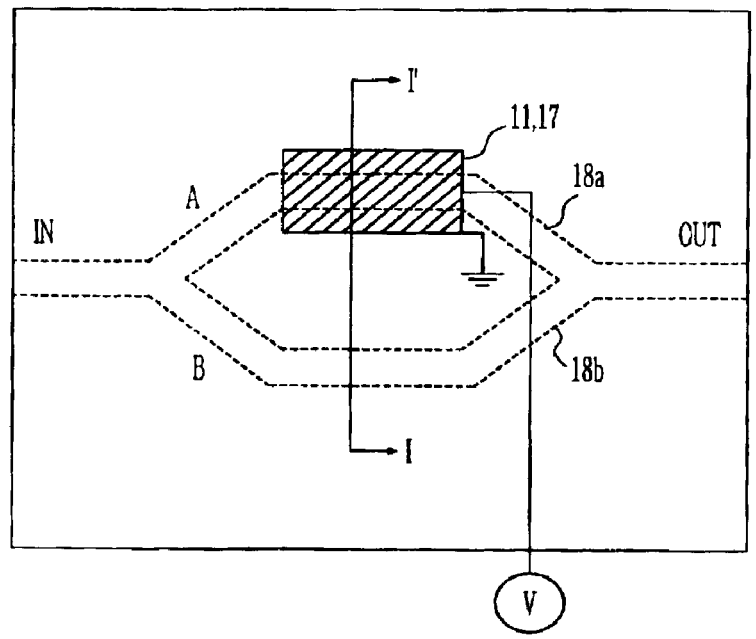
FIGS. 1A and 1B shows a view for explaining the configuration of optical intensity modulator of the prior art.
Figure 1B:
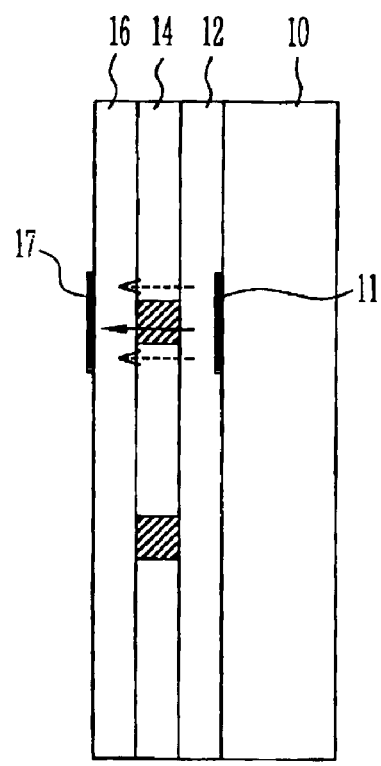

Hereinafter, the embodiments of the present invention will be explained with reference to the accompanying drawings. However, these embodiments are provided to fully understand those skilled in the art and can be modified in variation, and the scope of the present invention is not limited to these embodiments.

First Embodiment

The polarization-independent optical intensity modulator according to the first embodiment of the present invention will be explained with reference to the FIGS. 3a and 3b. The polarization-independent optical intensity modulator according to the first embodiment is an improved structure for improving the efficiency of electric field formed in the vertical direction to the core layer. In other words, according to the prior art, three electrodes were all coplanar types placed between a substrate and a lower cladding layer, but according to the embodiment of the present invention, two electrodes are formed on the lower surface of the lower cladding layer and one electrode is formed on the upper surface of the upper cladding layer. This means that the position of the electrodes for forming the poling and electric field parallel to the core layer was not changed and the position of the electrodes for forming the poling and electric field vertical to the core layer was changed.

The polarization-independent optical intensity modulator according to the first embodiment comprises a substrate 110, a lower cladding layer 112, optical waveguide core layer 114, an upper cladding layer 116, and electrodes 111a, 111b and 117.

The modulator is usually manufactured by the ordinary process, and for example, the optical waveguide core layer 114 made of electro-optic polymers can be manufactured by a selective etching process. Also, the index of refraction of the core layer 114 is greater than those of the upper and lower cladding layers 116, 112. Therefore, the light propagating along the core layer is fully reflected.

The substrate 110 is limited to the typical shape and can be one of various types, for example, a polymer film capable of improving the polarization and temperature characteristics or a silicon wafer, etc.

The lower cladding layer 112 can be any UV epoxies including NOA61, NOA73, etc, and should have the index of refraction lower than that of materials used for the core layer 114 so as to form the waveguide. The lower cladding layer 112 is formed on the substrate 110 by the spin-coating method.

The core layer 114 can be any polymeric materials like PMMA-DANS etc, and should have the index of refraction higher than that of materials used for the cladding layer so as to form the waveguide, and can be formed on the lower cladding layer 112 by the spin-coating method.

The upper cladding layer 116 can be any UV epoxies including NOA61, NOA73, etc, and should have the index of refraction lower than that of materials used for the core layer 114 so as to form the waveguide. The upper cladding layer 112 is formed on and around the core layer by the spin-coating method.

The electrodes 111a, 111b, 117 made of pure gold can be deposited on the substrate 110 or the upper cladding layer 116 by the thermal evaporation method.

Figure 2A:
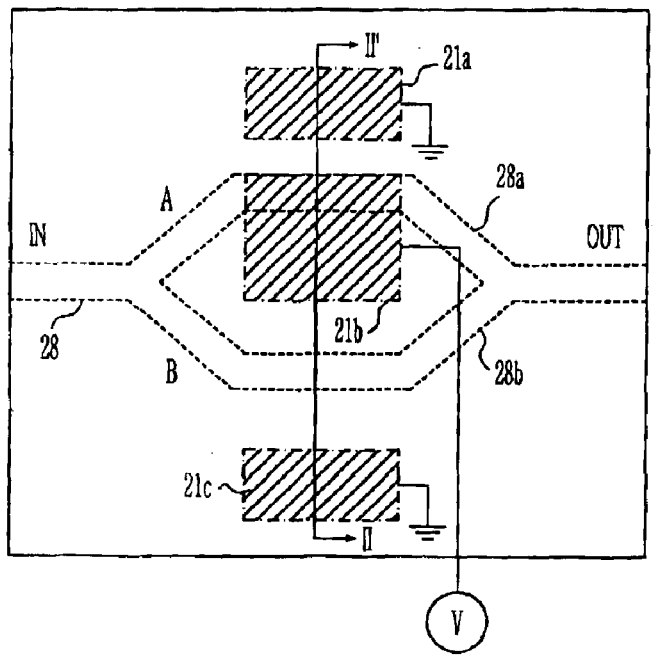
FIGS. 2A and 2B show views for explaining the configuration of polarization-independent optical intensity modulator of the prior art.
Figure 2B:
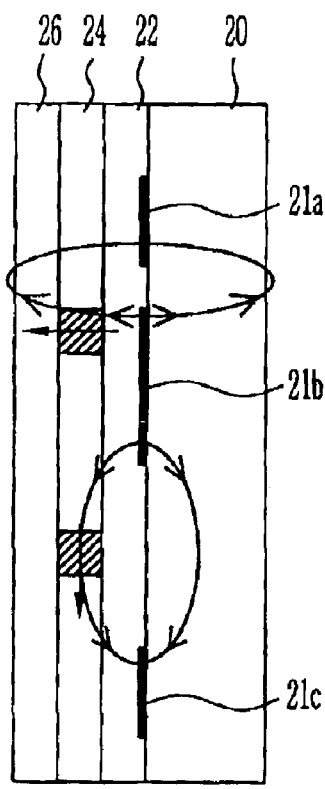

According to the structure of the aforementioned polarization-independent optical intensity modulator, the electric field formed in the direction vertical to the core layer 114 is straight between the two electrodes 111a, 117, and can be used in more effective way than that formed in circular shape according to the prior art shown in FIGS. 2A and 2B. Therefore, the modulator according to the present invention can ensure the phase change same to the phase change due to the prior art even with a small voltage, thereby can reduce the switching voltage for switching on-off the optical intensity.

Also, when the modulator is driven by the push-pull method of reversing the driving electrode polarity of one pair of two pairs of electrode from the polarity at poling, the switching voltage can be reduced in half.

Figure 3A:
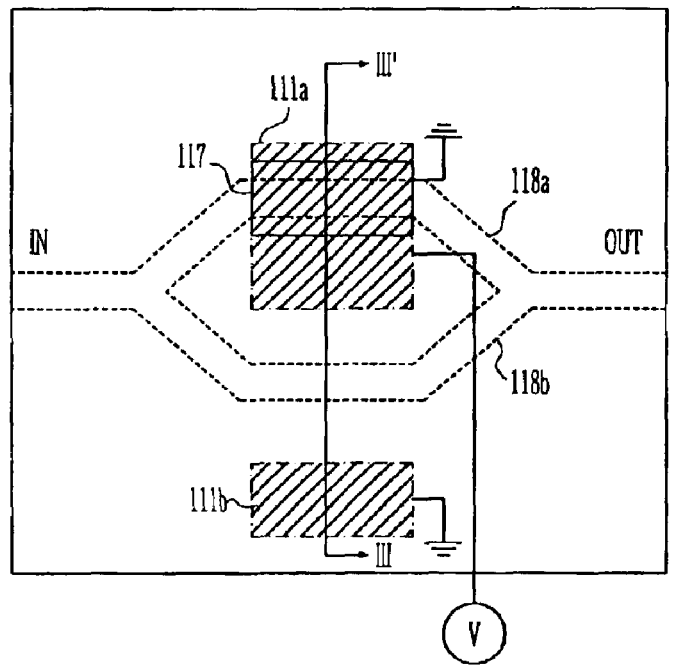
FIGS. 3A and 3B show views for explaining the polarization-independent optical polymeric intensity modulator in accordance with the first embodiment of the present invention.
Figure 3B:
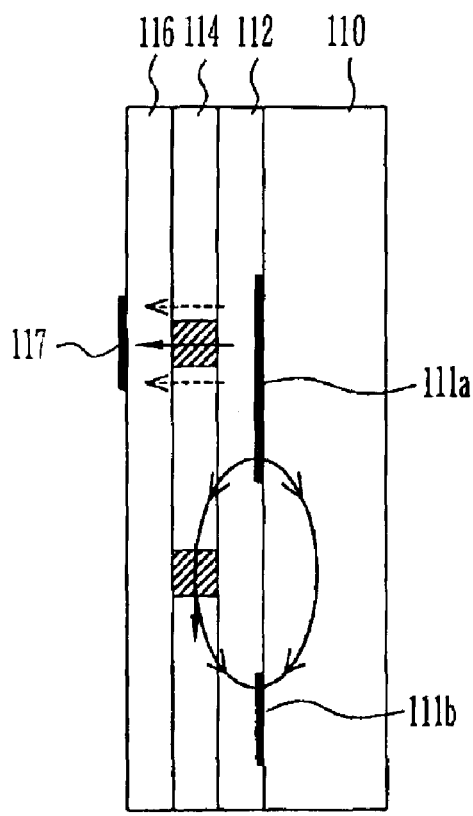

Meanwhile, referring to FIG. 3A, it is apparent that the short electrode 111b on the lower cladding layer 112 and the electrode 117 on the upper cladding layer 116 is grounded and the long electrode 111a on the lower cladding layer 111a is applied with a predetermined voltage, and vise versa. Also, the electrode 111a on the lower cladding layer 112 for applying voltage is shown as one long electrode, but can be separated into two electrodes perpendicular each other, wherein one ground electrode of the two is formed on the upper cladding layer 116 and the other ground electrode on the lower cladding layer 112, and has the same effect as the first embodiment.

Second Embodiment

Figure 4A:
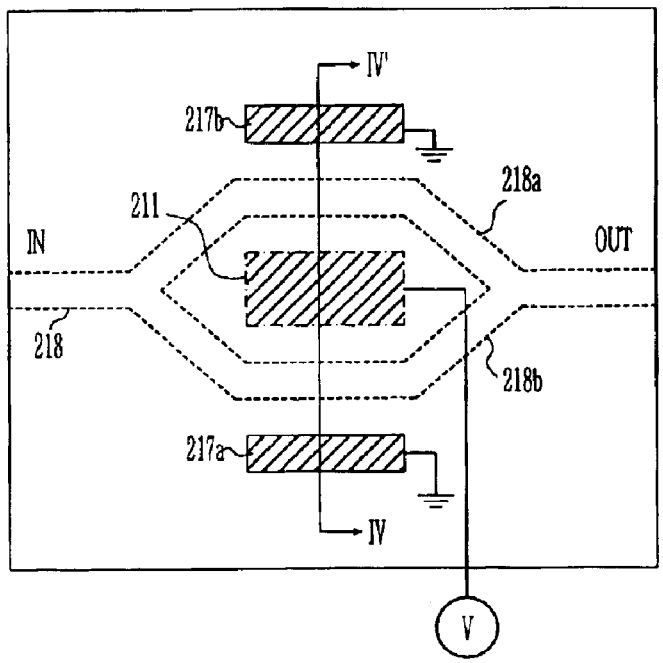
FIGS. 4A and 4B show views for explaining the polarization-independent optical polymeric intensity modulator in accordance with the second embodiment of the present invention.
Figure 4B:
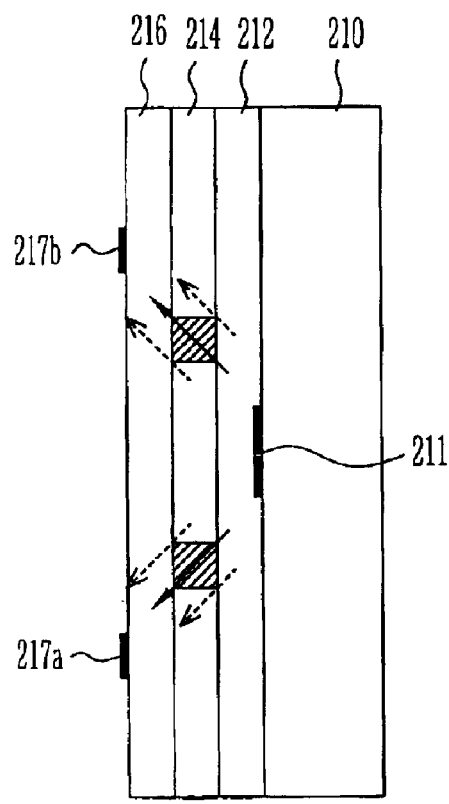

The polarization-independent optical intensity modulator according to the second embodiment of the present invention will be explained with reference to the FIGS. 4A and 4B. However, the explanation same as the first embodiment is omitted as a matter of convenience.

The polarization-independent optical intensity modulator according to the second embodiment comprises a substrate 210, a lower cladding layer 212, a core layer 214, an upper cladding layer 216, and electrodes 211, 217a, 217b. In this embodiment, two electrodes are placed on the upper cladding layer 216a and the rest one is placed on the lower surface of the lower cladding layer 212. It is shown that the electrodes 217a, 217b on the upper cladding layer 216 is grounded and the electrode 211 on the upper cladding layer 212 is applied with a predetermined voltage, but the reverse configuration can be possible and the same effect can be obtained.

Also, the electrode 211 on the lower cladding layer 212 can be separated into two electrodes wherein each electric field formed by the two electrodes and the corresponding electrodes 217a, 217b is perpendicular each other. At this time, with a proper adjustment of the placed voltage electrode 211 and the ground electrode 217a, 217b, each electric field can be 45° to the surface of the substrate 210 and perpendicular each other.

According the aforementioned configuration, the electric field formed straight between the shortest distance of the two electrodes can be used, thereby can be used in more effective way than that of the prior art. Therefore, the polarization-independent optical intensity modulator according to the present embodiment has a switching voltage lower than that of the prior art shown in FIG. 2.

Also, in this second embodiment in addition to the first embodiment, when the modulator is driven by the push-pull method of reversing the driving electrode polarity of one pair of two pairs of electrode from the polarity at poling, the switching voltage can be reduced in half.

However, the channel waveguide type core layer is described for example, the same effect can be obtained from the rib (or ridge) waveguide type core.

Although the present invention has been described in conjunction with the preferred embodiment, the present invention is not limited to the embodiment, and it will be apparent to those skilled in the art that the present invention can be modified in variation within the scope of the invention The structure of the polarization-independent optical polymeric intensity modulator using the Mach-Zehnder interferometer described in the present invention can use the voltage applied outside in more effective way compared to the structure of the prior art, thereby can switch on-off the optical intensity even with a small voltage. The optical intensity without regard to the polarization of input light can be modulated and the general optical fiber can be used instead of polarization-maintained optical fiber at the input end, thereby the packaging for optical modulator can be greatly facilitated. The modulator of the present invention can not only be used as the modulator for transmitting the light but used as the switching element for signal processing at the wavelength division optical network node.

What is claimed is:

1. A polarization-independent optical polymeric intensity modulator, comprising:

a substrate;

a lower cladding layer formed on the substrate;

a core layer on said lower cladding layer, said core layer having a first and a second optical guiding paths including polymers poled by electric field, wherein each input and output thereof are interconnected;

an upper cladding layer formed on said core layer and surrounding said first and second optical guiding paths of the core layers; and a first, second and third electrodes formed outside said cladding layers to apply electric fields to said first and second optical guiding paths, wherein said first and second electrodes are each positioned on the upper sides of said first and second optical guiding path (i.e., the upper surface of said upper cladding layer), and said third electrode is positioned on the lower side of said optical guiding path (i.e., the upper surface of said substrate), and wherein the electric field applied to said first optical guiding path and the electric field applied to said second optical guiding path are symmetric and have inclinations of about 45° with respect to the surface of the substrate.

2. The polarization-independent optical polymeric intensity modulator according to claim 1, the electric field applied to said first optical guiding path and the optical electric field applied to said second optical guiding path are orthogonal.

3. The polarization-independent optical polymeric intensity modulator according to the claim 1, a ground voltage is applied to said first electrode and second electrode, and a predetermined voltage is applied to said third electrode.

4. The polarization-independent optical polymeric intensity modulator according to the claim 3, a predetermined voltage is applied to said first electrode and second electrode, and a wound voltage is applied to said third electrode.

5. The polarization-independent optical polymeric intensity modulator according to the claim 1, the electric field of said first and third electrodes and the one of said second electrode are perpendicularly applied each other.

6. The polarization-independent optical polymeric intensity modulator according to claim 1, said optical waveguide guiding paths are channel waveguide type or rib (or ridge) waveguide type.

* * * * *